Patented Mar. 8, 1938

2,110,846

UNITED STATES PATENT OFFICE 2,110,846

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937,
Serial No. 149,468

15 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive, and efficient process for separating emulsions of the kind referred to into their component parts of oil and water or brine.

Briefly described, my process consists in subjecting a petroleum emulsion to the action of a demulsifying agent comprising a carboxylic amide or amide body of the kind hereinafter described, thereby causing the emulsion to break down and separate into its component parts of oil and water or brine, when the emulsion is permitted to remain in a quiescent state after treatment, or is subjected to other equivalent separatory procedure. The amide used as the demulsifying agent of my process is characterized by the presence of at least one hydroxyl group and at least one sulfate group attached to the same or different hydrocarbon radicals which, in turn, are substituted in the amino hydrogen atom position. Such materials may be obtained in various manners as hereinafter described.

United States Patent No. 2,050,925, dated August 11, 1936, to Melvin De Groote, describes a process for breaking petroleum emulsions, which consists in subjecting the emulsion to the action of a sulfo-carboxylic amide body of the following formula type:

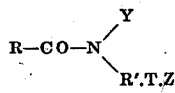

in which R—CO represents the acyl radical of a carboxylic detergent-forming acid, Y is a hydrogen atom or monovalent hydrocarbon radical, R' is a divalent hydrocarbon residue, T is a sulfonic acid residue selected from the class consisting of $SO_3$ and $OSO_3$ radicals, and Z is an ionizable hydrogen atom equivalent, that is the hydrogen atom itself, or a metallic atom or the like.

The amide used as the demulsifying agent of my present process is characterized by being similar to the amide employed as the demusifying agent in the forementioned De Groote patent except that there must be present at least one sulfo radical in the form of a sulfate, and at least one hydroxyl radical, both of which must be attached to a hydrocarbon radical or radicals which, in turn, are substituted in the amino hydrogen atom position. Such hydrocarbon radicals may be further substituted by the presence of a sulfonic acid radical. The sulfate radical and the hydroxyl radical previously referred to may be attached to the same hydrocarbon radical or to different hydrocarbon radicals.

It is well known, of course, that amides may be obtained by reaction between long carbon chain carboxy acids and monoalkylolamines, such as monoethanolamine, monopropanolamine, monobutanolamine, etc. The manufacture of such chemical compounds, particularly where derived from higher fatty acids, is described in British Patent No. 450,672, dated July 17, 1936, to Orelup. Dialkylolamines may be employed in a similar manner. Another procedure which has been employed for the same purpose is to react the alkylolamine with the acyl chloride derived from a suitable carboxy acid. Still another procedure employs an alkylene oxide, such as ethylene oxide, propylene oxide, butylene oxide, and the like, in connection with an amide. Reference is made to United States Patent No. 2,002,613, dated May 28, 1935, to Orthner and Keppler. This latter method for producing oxyamides is not limited to the use of alkylolamines, such as monoalkylolamines, dialkylolamines, or the like as the raw material, but one may employ alkylamines, arylamines, aralkylamines, cycloaliphatic, hydroaromatic and alicyclic amines, so as to obtain hydroxylated derivatives.

The various amides or esterified amide bodies of the kind employed as demulsifying agents in the present process are derived most readily from detergent-forming carboxylic acids. Detergent-forming carboxylic acids are of the type of acids which combine with alkalies, such as caustic soda or caustic potash to produce soap or soap-like bodies. Well known examples of such detergent-forming acids are fatty acids, such as oleic acid, stearic acid, etc., as well as abietic acid, and various naphthenic acids. Petroleum carboxy acids are also derived by the oxidation of paraffin or petroleum wax and may be used to produce the treating agent contemplated by my process, provided that they are characterized by the fact that they combine with alkalies to form soap or soap-like materials.

Obviously, the detergent acid of the type

RCOOH, which supplies the acyl radical R—CO, may be subjected to any suitable modification which does not destroy its ability to form a soap or soap-like body. For instance, oleic acid may be chlorinated, and one might employ such chlorinated oleic acid instead of oleic acid, in producing the treating agent used in my process. Ricinoleic acid may be sulfated to produce sulforicinoleic acid, and this particular material may be employed. Rosin might be hydrogenated and such hydrogenated abietic acid might be employed. Naphthenic acids may be brominated, and such brominated naphthenic acids may be employed. In all cases, the modified form must still possess the detergent-forming characteristic of the unaltered parent acid. The words "detergent-forming acid" will hereafter be used in the sense to include not only such materials as naphthenic acids, fatty acids, abietic acids, etc., but also their modifications of the kind indicated as being equally suitable.

Typical of some of the amides derived from detergent-forming carboxy acids which may be sulfated so as to yield demulsifying agents suitable for use in the present process are the following types:

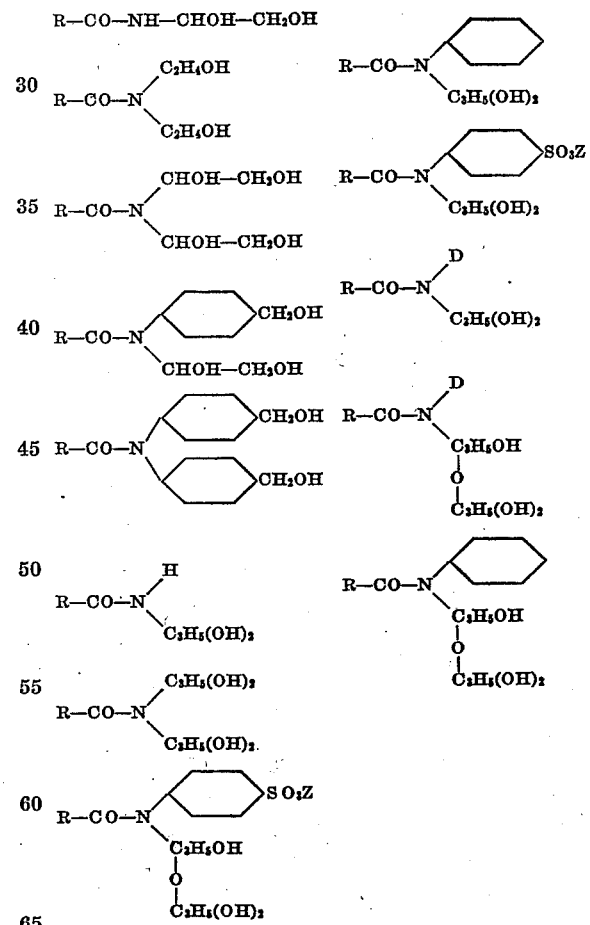

In the above formulas, R denotes a hydrocarbon or oxyhydrocarbon derived from a detergent-forming carboxy acid and the hexagon denotes a monocyclic or polycyclic aromatic residue or a substituted mono- or poly-aromatic residue. Such polycyclic aromatic residues may be advantageously derived from naphthalene. Z is an ionizable hydrogen atom or its equivalent. D denotes a monovalent aliphatic, alicyclic or aralkyl radical, which may or may not be substituted. For sake of convenience alkyloxyalkyl radicals are considered as being alkyl radicals.

Reference is made to United States Letters Patent No. 2,042,621, dated June 2, 1936, to Olin. This patent discloses the manufacture of various amines some of which are characterized by the presence of two hydroxyl radicals. One of the materials there described, for example, is 1-mono-amyl amino propane-2,3-diol (1-monoamyl amino-2-hydroxy-3-propanol), which is of the following formula:

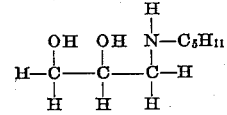

Similar materials are obtainable from glycidol and also are obtainable from alcohol ethers, such as diglycerol, diethlene glycol and the like, instead of from the glycols, glycerol, and the like. Other comparable materials include 1-mono benzyl amino propane-2,3-diol, which is of the following formula:

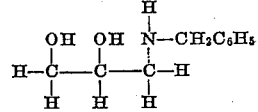

Similar derivatives are obtainable from an alicylic amine, such as cyclohexylamine, methylcyclohexylamine, and the like, by reacting such amines with glycerol monochlorhydrin and the like.

It has been previously pointed out that the detergent-forming carboxy acid may itself be modified by the introduction of some other substituent atom or radical in the hydrocarbon chain. Particularly effective reagents are obtained by introduction of sulfo radicals into the hydrocarbon chain or the oxyhydrocarbon chain of the detergent-forming carboxy acid. It is well known, of course, that oleic acid, for example, can be treated with sulfuric acid at relatively low temperatures (35° C. or less) to produce oleic acid hydrogen hydrogen sulfate. This material may also be designated as hydrogen sulfate stearic acid and is sometimes referred to as sulfostearic acid or sulfo-oleic acid. In essence, sulfuric acid splits as indicated in the following reaction:

$$HHSO_4 \longrightarrow H + HSO_4$$

and the ethylene linkage of oleic acid or the like is saturated by the addition of the hydrogen atom and an $HSO_4$ radical.

Similarly, acid sulfates may be derived from hydroxylated fatty acids, such as ricinoleic acid, hydroxystearic acid, diricinoleic acid, and the like, by reactions involving the alcoholiform hydroxyl and sulfuric acid as indicated by the following reaction:

True sulfonic acids can be derived from materials such as oleic acid in various manners, such as treating oleic acid with sulfuric acid at or near the boiling point of water. In such instances the reaction may be considered as if sulfuric acid splits as indicated by the following reaction:

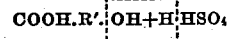

and as if the ethylene linkage were saturated by the introduction of an OH radical and an $HSO_3$ radical.

Still another suitable procedure is to treat a hydroxylated or unsaturated fatty acid or the like with equal molecular amounts of a suitable aromatic compound such as phenol, benzene, naphthalene, and the like, in the presence of an excess of a sulfonating agent, such as sulfuric acid. This is the typical reaction for the production of sulfo-aromatic fatty acids commonly refererd to as Twitchell reagents. In such instances, the ethylene linkage is substituted by a hydrogen atom and a sulfo-aromatic radical or else the alcoholic hydroxyl radical attached to the carbon chain is replaced by a sulfo-aromatic radical. All these various sulfo fatty acids previously described are well known compositions of matter and their method of manufacture is well known. The product obtained from oleic acid and phenol, for example, is commonly referred to as sulfophenolstearic acid and its composition is indicated by the following formula:

$$C_6H_3OH.HSO_3.C_{17}H_{34}COOH.$$

It is further emphasized that the present process is concerned with reagents of the kind fully described and is not dependent on any particular way in which the said reagents are obtained, except when specificaly so stated. They may be produced in any suitable manner. Any isomeric form may be employed. As far as I am aware, one isomeric form is as suitable as another. It is also obvious that any functional equivalent of any compound which obviously acts in the same manner as the compound itself is just as suitable as the unaltered material. For instance, the chlorinated amide derived from the oleic acid dichloride is just as suitable as the amide derived from oleic acid. An amine in which a chloralkyl radical replaces an alkyl radical is just as satisfactory as if the unaltered alkyl radical were present in the amine.

Any of the detergent-forming carboxy acids of the kind previously described may be reacted by any of the procedures previously referred to so as to yield an amide characterized by the presence of two or more alcoholic hydroxyls attached to radicals replacing amino hydrogen atoms. I have found that one produces an effective demulsifying agent if one treats such amides with a suitable sulfonating or sulfating agent so as to obtain materials characterized by the presence of at least one sulfate radical and at least one alcoholic hydroxyl radical attached to the same or different radicals which have replaced the amino hydrogen atoms. If the compound employed as a reagent in the aforementioned De Groote patent be characterized by the formula previously referred to, i. e.:

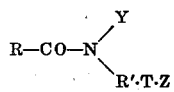

the reagent in the present instance may be characterized by the following formula:

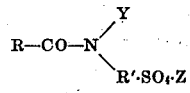

in which all the characters have their previous significance except that Y, in addition to being a hydrogen atom or a monovalent hydrocarbon atom, may also be a hydroxylated monovalent hydrocarbon radical or a sulfated hydrocarbon radical or a sulfated hydroxylated hydrocarbon radical or a sulfonated hydrocarbon radical of the sulfonic acid type, and R' may be a divalent hydrocarbon radical or a divalent hydroxylated hydrocarbon radical with the added proviso that the radical

must contain at least one hydroxyl group attached to a hydrocarbon radical.

In the sulfation (sulfonation) process in which the polyhydroxylated amide is treated with a suitable sulfating or sulfonating agent and subsequently washed and separated in the conventional manner, it is obvious that the final product is characterized by a free acidic (ionizable) hydrogen atom. The material may be used in the acidic state, but in order to prevent corrosion, it is usually desirable that the free acidic hydrogen be replaced by a suitable organic radical or by a metallic atom or by an ammonium radical or by a substituted ammonium radical (amine radical). For instance, such ionizable hydrogen atom may be replaced by an alkyl radical derived from a monohydric alcohol, such as methyl alcohol, ethyl alcohol, propyl alcohol, butyl alcohol, amyl alcohol, hexyl alcohol, etc. The material may be neutralized with any suitable base, such as caustic soda, caustic potash, ammonia, propanolamine, dipropanolamine, tripropanolamine, triethanolamine, diethanolamine, benzylamine, morpholine, amylamine, diamylamine, triamylamine, cyclohexylamine, or the like. One may likewise prepare polyvalent metallic salts, such as iron salts, copper salts, lead salts, calcium salts, magnesium salts, etc. Furthermore, such ionizable hydrogen atom may be replaced by a residue derived from various polyhydric alcohols. Such polyhydric alcohols may be aliphatic, aromatic, alicyclic, aralkyl, heterocyclic, etc. Suitable polyhydric alcohols include ethylene glycol, glycerol, and the polyhydric alcohol ethers, such as diethylene glycol, diglycerol, etc.

The polyhydroxylated amide of the kind described may be sulfated in any suitable manner, provided that the reaction is conducted so that there is at least one residual alcoholic hydroxyl attached to the radical

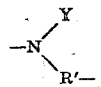

as previously indicated. Any conventional sulfation or sulfonation process may be employed. One may use ordinary sulfuric acid, such as 66° sulfuric acid, or even weaker acid, such as 64° acid, or the like, or one may use stronger sulfuric acid. One may use 100% sulfuric acid, often refered to as monohydrate, or oleum of various strengths, sulfur trioxide, chlorsulfonic acid, bromsulfonic acid, acetylsulfonic acid, etc. Where sulfur trioxide is employed, it may be introduced into the mixture in either gaseous, liquid or solid form. One may also use various sulfonating agents, such as sulfuric acid, in combination with reagents capable of removing water from the reaction mass, provided that such reagents do not react with the alcoholic hydroxyl, so as to eliminate it from the final product.

The sulfonation may be effected in a solvent or a suspension medium, that is to say, a medium which is liquid at the temperature of reaction, and is inert to the reactants, or does not affect the reaction unfavorably. As an example of a solvent or suspension medium, one may mention carbon tetrachloride, ethylene dichloride, trichlorethylene, tetrachlorethane, chloroform, liquid sulfur dioxide, diethyl ether, etc. Generally speaking, it is preferable to employ carbon tetrachloride. Solvent or suspension media are especially desirable when the sulfonating agent is sulfur trioxide.

I find it particularly desirable to sulfonate material of the kind in which one hydroxyl is attached to a primary carbon atom and the other hydroxyl is attached to a secondary or tertiary carbon atom. In such instances, there is a preferential sulfation of one hydroxyl, and it is relatively easy to add the amount of a suitable sulfonating agent, such as gaseous sulfur trioxide, so as to sulfate only one alcoholic hydroxyl. In other instances where the amide has been obtained by the action of an alkylene oxide, and where there are present a large number of alcoholic hydroxyls, it is not unusual to find that some of the alcoholic hydroxyls are not particularly susceptible to sulfation; or if they are sulfated, the conventional washing process regenerates the free hydroxyl. Such procedure is analogous to the sulfation of dihydroxystearic acid. Such sulfation, even if conducted in presence of a large excess of sulfuric acid, results in a hydroxylated and sulfated material after a conventional washing process. Ordinary sulfation does not appear to yield a stable disulfated product which is resistant to the conventional washing process employed in separating the acid mass. Similarly, in the sulfation of the polyhydroxylated amide of the kind herein described, even if sufficient sulfuric acid or any other sulfating agent, is employed to combine with all the alcoholic hydroxyl radicals present it is relatively easy to select the conditions of washing, perhaps involving a longer hydrolytic step, so that the resultant mass, in addition to containing one stable sulfate radical, also contains at least one hydroxyl attached to the radical,

previously described.

In view of what has been said previously, it is obvious that compounds can be prepared in which there is present a rather large number of alcoholic hydroxyls, especially if both substituents replacing the amino hydrogen atoms represent polyhydroxylated radicals. If such radicals are obtained, for example, from polyglycerols, such as diglycerol, triglycerol, or tetraglycerol, it is obvious that as many as 12 hydroxyl radicals may be present in the substituents replacing both amino hydrogens. Similarly, compounds hydroxylated to an equal degree may be obtained by means of an alkylene oxide. As a corollary, it follows that one could introduce a large number of sulfate radicals, because it is only necessary that there be at least one residual hydroxyl radical. As far as I am aware, no determination has been made of the maximum number of sulfate radicals which may be introduced. It would appear that in certain instances, probably as many as six sulfate radicals may be introduced, and certainly the introduction of two, three or four sulfate radicals presents no undue difficulty.

For sake of brevity the chemical compound employed as the demulsifying agent in the present process may be characterized by the formula

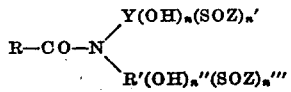

in which R—CO— has its previous significance and Y is a hydrogen atom or hydrocarbon radical; or may be a sulfonic acid radical of the type Y′SO₃Z but only in such instances where $n$ and $n'$ are zero; R′ is a hydrocarbon radical and $n$ and $n''$ represent the numerals 0 to 6 and $n'$ and $n'''$ represent the numerals 0 to 3 with the proviso that the amino radical.

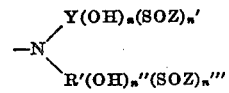

must contain at least one alcoholic hydroxyl radical and at least one sulfate radical attached to either Y or R′ or to both. Y′ is a hydrocarbon radical.

The expression "hydrocarbon" has been employed to indicate a radical consisting of carbon and hydrogen, without distinction as to whether it is monovalent, divalent, or trivalent (unless specifically so stated) and without reference as to whether it is aliphatic, aromatic, alicyclic, cyclo-aliphatic or aralkyl in character. In some instances, a substituted hydrocarbon radical, such as a chlor-hydrocarbon radical or brom-hydrocarbon radical, or the like, would obviously function in the same manner as the hydrocarbon radical and would be nothing more or less than the equivalent of the same. It is understood that the expression "hydrocarbon radical" includes substituted hydrocarbon radicals or the like, which are obvious functional equivalents.

My preferred reagent is obtained in the following manner: Monoamylamine is reacted with stearic acid, so as to produce a substituted stearamide which may be referred to as monoamyl stearamide. Its composition may be indicated by the following formula:

$$C_{17}H_{35}CO.H.N.C_5H_{11}$$

Anhydrous glycerol is converted into the monochlorhydrin, and such monochlorhydrin may be reacted with the monoamyl stearamide, so as to produce a product which, for simplicity, may be referred to as glyceromonoamyl stearamide and may be indicated by the following formula:

$$C_{17}H_{35}.COC_3H_5(OH)_2NC_5H_{11}$$

Glyceromonoamyl stearamide can be dissolved in or suspended in a suitable solvent, such as carbon tetrachloride, and treated with a stoichiometrical amount of sulfur trioxide in gaseous form, so as to produce a reagent of the following composition:

$$C_{17}H_{35}.COC_3H_5OH\ HSO_4\ NC_5H_{11}$$

which may be referred to as glyceromonoamyl stearamide acid sulfate. This product may be converted into the potassium salt, so as to yield a material of the following composition:

$$C_{17}H_{35}COC_3H_5OH\ KSO_4\ NC_5H_{11}$$

An even more effective reagent is obtainable by replacing stearic acid with sulforicinoleic acid sodium salt. Sulforicinoleic acid is a dibasic acid having one sulfonic hydrogen atom and one carboxylic hydrogen atom. If neutralized with a suitable base, for instance, caustic soda, so as to be basic to methyl orange, then only the sulfo hydrogen is replaced by the sodium atom. This product can be dehydrated and a material employed to replace stearic acid in the reaction above described. Such a reagent is particularly effective as a demulsifying agent.

It is to be noted that some of the demulsifying agents of the kind described may be water soluble and substantially oil insoluble. In other instances, where the heavy metal salt is formed or where a high molecular weight amine is used for neutralization, such as triamylamine, the resultant product may be water insoluble and oil soluble. In other instances, the product may show solubility in both oil and water, and in some instances rather limited solubility in either oil or water.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process. In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

I desire to point out that the superiority of the reagent used as the demulsifying agent in my process is based upon its ability to treat certain emulsions more advantageously and at a somewhat lower cost than is possible with other demulsifiers, or conventional mixtures thereof. It is believed that the particular demulsifying agent or treating agent herein described will find comparatively limited application so far as the majority of oil field emulsions are concerned; but I have found that such a demulsifying agent has commercial value, as it will economically break or resolve certain oil field emulsions in a number of cases which cannot be treated as easily or at so low a cost with the demulsifying agents heretofore available.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound of the formula type:

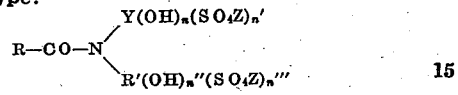

in which R—CO— is the acyl radical derived from a detergent-forming carboxy acid; $n$ and $n''$ represent the numerals 0 to 6 and $n'$ and $n'''$ represent the numerals 0 to 3; Z is an ionizable hydrogen atom equivalent; Y is a hydrocarbon radical and in such instances where $n$ and $n'$ represent zero, Y may be a hydrogen atom or a sulfonic acid radical of the type Y'SO$_3$Z in which Y' is a hydrocarbon radical; and R' is a hydrocarbon radical and there is the added proviso that the amino radical

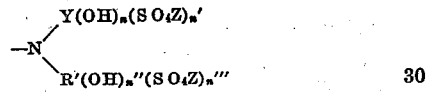

must contain at least one alcoholic hydroxyl radical and at least one sulfate radical attached to either Y or R' or to both.

2. A process for breaking petroleum emulsions of the water-in-oil type, which consists in subjecting the emulsion to the action of a demulsifying agent comprising a chemical compound of the formula type:

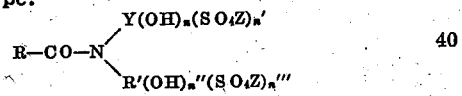

in which R—CO— is the acyl radical derived from a monocarboxy petroleum acid; $n$ and $n''$ represent the numerals 0 to 6 and $n'$ and $n'''$ represent the numerals 0 to 3; Z is an ionizable hydrogen atom equivalent; Y is a hydrocarbon radical and in such instances where $n$ and $n'$ represent zero, Y may be a hydrogen atom or a sulfonic acid radical of the type Y'SO$_3$Z in which Y' is a hydrocarbon radical; and R' is a hydrocarbon radical and there is the added proviso that the amino radical

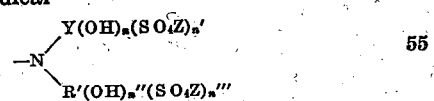

must contain at least one alcoholic hydroxyl radical and at least one sulfate radical attached to either Y or R' or to both.

3. A process for breaking petroleum emulsions of the water-in-oil type, which consists in subjecting the emulsion to the action of a demulsifying agent comprising a chemical compound of the formula type:

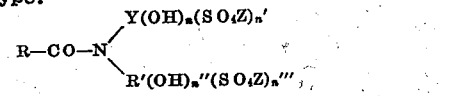

in which R—CO— is the acyl radical derived from a monocarboxy rosin acid; $n$ and $n''$ represent the numerals 0 to 6 and $n'$ and $n'''$ represent the numerals 0 to 3; Z is an ionizable hydrogen atom equivalent; Y is a hydrocarbon radical and in such instances where $n$ and $n'$ represent zero; Y may be a hydrogen atom or a sulfonic acid radical of the type Y'SO₃Z in which Y' is a hydrocarbon radical; and R' is a hydrocarbon radical and there is the added proviso that the amino radical

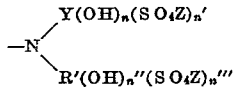

must contain at least one alcoholic hydroxyl radical and at least one sulfate radical attached to either Y or R' or to both.

4. A process for breaking petroleum emulsions of the water-in-oil type, which consists in subjecting the emulsion to the action of a demulsifying agent comprising a chemical compound of the formula type:

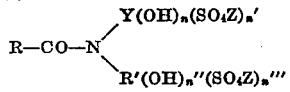

in which R—CO— is the acyl radical derived from a monocarboxy fatty acid; $n$ and $n'$ represent the numerals 0 to 6 and $n''$ and $n'''$ represent the numerals 0 to 3; Z is an ionizable hydrogen atom equivalent; Y is a hydrocarbon radical and in such instances where $n$ and $n'$ represented zero, Y may be a hydrogen atom or a sulfonic acid radical of the type Y'SO₃Z in which Y' is a hydrocarbon radical; and R' is a hydrocarbon radical and there is the added proviso that the amino radical

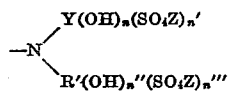

must contain at least one alcoholic hydroxyl radical and at least one sulfate radical attached to either Y or R' or to both.

5. A process for breaking petroleum emulsions of the water-in-oil type, which consists in subjecting the emulsion to the action of a demulsifying agent comprising a chemical compound of the formula type:

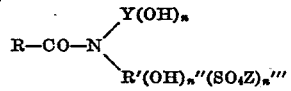

in which R—CO— is the acyl radical derived from a monocarboxy fatty acid, $n$ and $n''$ represent the numerals 0 to 6; and $n'''$ represents the numerals 1 to 3; Z is an ionizable hydrogen atom equivalent, Y is a hydrocarbon radical, and in such instances where $n$ represents zero, Y may be a hydrogen atom or a sulfonic acid radical of the type Y'SO₃Z, in which Y' is a hydrocarbon radical; and R' is a hydrocarbon radical; and there is the added proviso that the amino radical

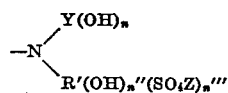

must contain at least one alcoholic hydroxyl radical attached to either Y or R' or to both.

6. A process for breaking petroleum emulsions of the water-in-oil type, which consists in subjecting the emulsion to the action of a demulsifying agent comprising a chemical compound of the formula type:

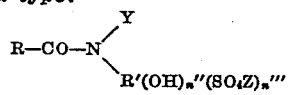

in which R—CO— is the acyl radical derived from a monocarboxy fatty acid; $n''$ represents the numerals 1 to 6 and $n'''$ represents the numerals 1 to 3; Z is an ionizable hydrogen atom equivalent; Y is a hydrogen atom, a hydrocarbon radical, or a sulfonic acid radical of the type Y'SO₃Z, in which Y' is a hydrocarbon radical; and R' is a hydrocarbon radical.

7. A process for breaking petroleum emulsions of the water-in-oil type, which consists in subjecting the emulsion to the action of a demulsifying agent comprising a chemical compound of the formula type:

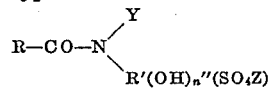

in which R—CO— is the acyl radical derived from a monocarboxy fatty acid; $n''$ represents the numerals 1 to 6; Z is an ionizable hydrogen atom equivalent; Y is a hydrogen atom, a hydrocarbon radical, or a sulfonic acid radical of the type Y'SO₃Z, in which Y' is a hydrocarbon radical; and R' is a hydrocarbon radical.

8. A process for breaking petroleum emulsions of the water-in-oil type, which consists in subjecting the emulsion to the action of a demulsifying agent comprising a chemical compound of the formula type:

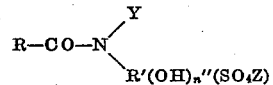

in which R—CO— is the acyl radical derived from a monocarboxy fatty acid; $n''$ represents the numerals 1 to 6; Z is an ionizable hydrogen atom equivalent; Y is a hydrogen atom or a hydrocarbon radical; and R' is a hydrocarbon radical.

9. A process for breaking petroleum emulsions of the water-in-oil type, which consists in subjecting the emulsion to the action of a demulsifying agent comprising a chemical compound of the formula type:

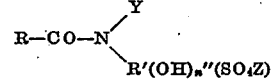

in which R—CO— is the acyl radical derived from a monocarboxy fatty acid; $n''$ represents the numerals 1 to 6; B is an ionizable hydrogen atom equivalent; Y is a hydrocarbon radical; and R' is a hydrocarbon radical.

10. A process for breaking petroleum emulsions of the water-in-oil type, which consists in subjecting the emulsion to the action of a demulsifying agent comprising a chemical compound of the formula type:

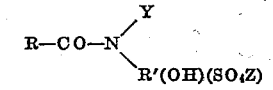

in which R—CO— is the acyl radical derived from a monocarboxy fatty acid; Z is an ionizable hydrogen atom equivalent; Y is a hydrocarbon radical; and R' is a hydrocarbon radical.

11. A process for breaking petroleum emulsions of the water-in-oil type, which consists in subjecting the emulsion to the action of a demulsifying agent comprising a chemical compound of the formula type:

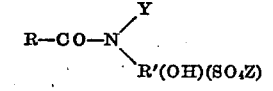

in which R—CO— is the acyl radical derived from a monocarboxy fatty acid; Z is an ionizable hydrogen atom equivalent; Y is an aliphatic hydrocarbon radical; and R' is a hydrocarbon radical.

12. A process for breaking petroleum emulsions of the water-in-oil type, which consists in subjecting the emulsion to the action of a demulsifying agent comprising a chemical compound of the formula type:

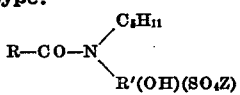

in which R—CO— is the acyl radical derived from a monocarboxy fatty acid; Z is an ionizable hydrogen atom equivalent; and R' is a hydrocarbon radical.

13. A process for breaking petroleum emulsions of the water-in-oil type, which consists in subjecting the emulsion to the action of a demulsifying agent comprising a chemical compound of the formula type:

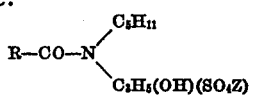

in which R—CO— is the acyl radical derived from a monocarboxy fatty acid and Z is an ionizable hydrogen atom equivalent.

14. A process for breaking petroleum emulsions of the water-in-oil type, which consists in subjecting the emulsion to the action of a demulsifying agent comprising a chemical compound of the formula type:

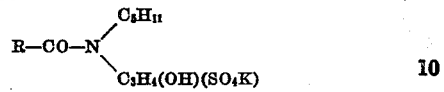

in which R—CO— is the acyl radical derived from a monocarboxy fatty acid.

15. A process for breaking petroleum emulsions of the water-in-oil type which consists in subjecting the emulsion to the action of a demulsifying agent comprising a chemical compound of the formula type:

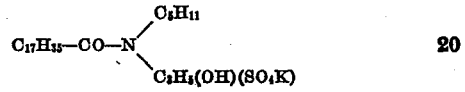

MELVIN DE GROOTE.